(12) United States Patent
Stockton et al.

(10) Patent No.: US 12,094,243 B2
(45) Date of Patent: Sep. 17, 2024

(54) METHOD AND APPARATUS FOR DISCREET PERSON IDENTIFICATION ON POCKET-SIZE OFFLINE MOBILE PLATFORM WITH AUGMENTED REALITY FEEDBACK WITH REAL-TIME TRAINING CAPABILITY FOR USAGE BY UNIVERSAL USERS

(71) Applicant: Board of Regents, The University of Texas System, Austin, TX (US)

(72) Inventors: Patrick Michael Stockton, San Antonio, TX (US); Eugene Britto John, San Antonio, TX (US)

(73) Assignee: Board of Regents, The University of Texas System, Austin, TX (US)

( * ) Notice: Subject to any disclaimer, the term of this patent is extended or adjusted under 35 U.S.C. 154(b) by 429 days.

(21) Appl. No.: 17/324,909

(22) Filed: May 19, 2021

(65) Prior Publication Data

US 2021/0365673 A1 Nov. 25, 2021

Related U.S. Application Data

(60) Provisional application No. 63/027,326, filed on May 19, 2020.

(51) Int. Cl.
*G06V 40/16* (2022.01)
*G06F 1/16* (2006.01)
(Continued)

(52) U.S. Cl.
CPC ............ *G06V 40/172* (2022.01); *G06F 1/163* (2013.01); *G06N 20/00* (2019.01); *G06V 40/197* (2022.01); *G06V 40/25* (2022.01); *G10L 17/04* (2013.01)

(58) Field of Classification Search
CPC .... G06V 40/172; G06V 40/197; G06V 40/25; G06V 10/774; G06V 10/80; G06V 10/82;
(Continued)

(56) References Cited

U.S. PATENT DOCUMENTS 9,460,351 B2 * 10/2016 Kim ..................... H04N 7/181
10,061,996 B1 * 8/2018 Chow .................. G06V 40/171
(Continued)

FOREIGN PATENT DOCUMENTS

WO WO-2018005985 A1 * 1/2018 ........... G02B 27/017
WO WO-2020215898 A1 * 10/2020 ............... A47G 1/02

*Primary Examiner* — Mia M Thomas
(74) *Attorney, Agent, or Firm* — Smith, Gambrell & Russell, LLP; Gregory J. Kirsch

(57) ABSTRACT

Embodiments may provide improved techniques and devices for person identification that are discreet, offline, that can be trained in real-time and are physically small to provide the comfortable and convenient use in everyday situations. For example, in an embodiment, a system may comprise a wearable device comprising a visual display, an audio output device, and at least one sensor, a computer system comprising a processor, memory accessible by the processor, and computer program instructions stored in the memory and executable by the processor, receiving, from at least one sensor, data captured by the sensor, identifying a person based on the data captured by the sensor using a trained machine learning model, and indicating an identity of the person using at least one of the visual display and the audio output device. A person is also identified using fusion data recognition of sensor data fusion of at least two types of sensor data. System can perform person identification in total darkness using appropriate senor data identification. The system can train an un-trained machine learning model in real-time upon user request and/or command using the data collected by the sensors.

11 Claims, 6 Drawing Sheets

(51) Int. Cl.
*G06N 20/00* (2019.01)
*G06V 40/18* (2022.01)
*G06V 40/20* (2022.01)
*G10L 17/04* (2013.01)

(58) Field of Classification Search
CPC ........ G06V 10/94; G06V 20/20; G06V 40/70; G06F 1/163; G06F 3/017; G06N 20/00; G06N 3/04; G06N 3/08; G06N 3/105; G10L 17/04; G10L 17/00
See application file for complete search history.

(56) References Cited

U.S. PATENT DOCUMENTS

| | | | | |
|---|---|---|---|---|
| 10,571,263 | B2 * | 2/2020 | Abovitz | G06F 3/04815 |
| 10,937,243 | B2 * | 3/2021 | Hamlin | G02B 27/0093 |
| 11,556,980 | B2 * | 1/2023 | Yankovich | G06T 19/006 |
| 11,611,705 | B1 * | 3/2023 | Chen | H04N 23/69 |
| D996,425 | S * | 8/2023 | Fu | D14/372 |
| D996,426 | S * | 8/2023 | Fu | D14/372 |
| 2012/0299950 | A1 * | 11/2012 | Ali | G06T 19/006 345/592 |
| 2017/0084084 | A1 * | 3/2017 | Durham | G06F 3/04842 |
| 2018/0181794 | A1 * | 6/2018 | Benini | G06V 40/18 |
| 2018/0204382 | A1 * | 7/2018 | Simpson | G06F 3/013 |
| 2018/0232471 | A1 * | 8/2018 | Schissler | G06F 18/2413 |
| 2018/0249151 | A1 * | 8/2018 | Freeman | A61B 5/1123 |
| 2018/0349682 | A1 * | 12/2018 | Wong | G06V 40/172 |
| 2019/0321583 | A1 * | 10/2019 | Poltorak | A61M 21/02 |
| 2019/0385380 | A1 * | 12/2019 | Yoon | G06T 19/006 |
| 2020/0134424 | A1 * | 4/2020 | Chen | G06N 3/084 |
| 2020/0175352 | A1 * | 6/2020 | Cha | G06N 3/04 |
| 2020/0184671 | A1 * | 6/2020 | Yang | G06F 3/0482 |
| 2020/0257913 | A1 * | 8/2020 | Xu | G06V 40/171 |
| 2021/0209388 | A1 * | 7/2021 | Ciftci | G06N 3/08 |
| 2021/0391089 | A1 * | 12/2021 | Eswara | G06V 20/53 |
| 2022/0053039 | A1 * | 2/2022 | Bhatt | H04L 12/1831 |
| 2022/0148276 | A1 * | 5/2022 | Golobokov | G06T 19/20 |
| 2023/0052727 | A1 * | 2/2023 | Bargoti | G06T 7/0004 |
| 2023/0222842 | A1 * | 7/2023 | Hua | G06V 40/45 382/181 |
| 2023/0230292 | A1 * | 7/2023 | Ivanov | G06V 20/20 345/633 |
| 2023/0238098 | A1 * | 7/2023 | Langan | G16H 40/67 345/156 |
| 2023/0245495 | A1 * | 8/2023 | Ninh | G06V 40/168 382/118 |
| 2023/0346296 | A1 * | 11/2023 | Hyde | A61B 5/441 |
| 2023/0401824 | A1 * | 12/2023 | Khan | G06V 20/70 |

* cited by examiner

METHOD AND APPARATUS FOR DISCREET PERSON IDENTIFICATION ON POCKET-SIZE OFFLINE MOBILE PLATFORM WITH AUGMENTED REALITY FEEDBACK WITH REAL-TIME TRAINING CAPABILITY FOR USAGE BY UNIVERSAL USERS

CROSS-REFERENCE TO RELATED PATENT APPLICATION(S)

This patent application claims the benefit of U.S. provisional application 63/027,326, filed May 19, 2020, the contents of which are incorporated in their entirety herein.

BACKGROUND

The present invention relates to techniques and devices for person identification that are discreet, offline, that can be trained in real-time, and are physically small using outputs from one or more sensors embedded or attached to the device.

The concept of machine learning and computer vision has been established for the last few decades, however their viability in everyday usage hasn't been practical until recently. With the emergence of powerful enough devices and software tools, the viability of using machine learning and computer vision has been realized in a large number of applications. One such popular application is real-time person identification. As person identification is one such application, the context in which it is needed and used leads to the ability to offer such a solution to a wide number of users. These solutions can include recognition of patients in a hospital, students in a classroom, allowing individuals suffering from dementia to recognize certain individuals, residents in nursing homes to recognize each other if their names are forgotten, and many others. However, conventional solutions are large and obvious and require online connectivity.

Accordingly, a need arises for improved techniques for person identification that are discreet, offline, that can be trained in real-time, and are physically small to provide the comfortable and convenient use in everyday situations.

SUMMARY

Embodiments may provide improved techniques and devices for person identification that are discreet, offline, that can be trained in real-time, and are physically small to provide the comfortable and convenient use in everyday situations. Embodiments may provide a physically small, offline, mobile solution for providing discreet person identification with instant feedback through augmented reality glasses. Rather than a specific solution to one use case or a set of use cases for a user, embodiments may provide a fully modular platform that may allow the user to configure the device to their current needs.

For example, in an embodiment, a system may comprise a wearable device comprising a visual display, an audio output device, and at least one sensor, a computer system comprising a processor, memory accessible by the processor, and computer program instructions stored in the memory and executable by the processor, receiving, from at least one sensor, data captured by the sensor, identifying a person based on the data captured by the sensor using a trained machine learning model or an untrained machine learning model that can be trained real-time as needed using the sensor data, and indicating an identity of the person using at least one of the visual display and/or the audio output device.

In embodiments, the wearable device may comprise glasses. The sensors may comprise at least one of a camera that can capture image and or video, a microphone, a body odor sensor, and a thermal imaging camera (TIC). The data captured by the sensor may be image data and the person may be identified using facial recognition. The facial recognition may be performed in real-time and the machine learning model is one of OpenCV Caffe, OpenFace, FaceNet or any other openly available or custom libraries and or models. The data captured by the sensor may be a short video of the person walking and the person is identified using gait recognition. The data captured by the sensor may be audio data and the person may be identified using voice recognition. The data captured by the sensor may be the image of the periocular and/or iris of the person and the person may be identified using periocular and/or iris recognition. The data captured by the sensor may be thermal image of the person and the person may be identified using thermal image recognition. The data captured by the sensor may be body odor of the person and the person may be identified using body order recognition. The computer system may be contained in a device separate from the glasses. The computer system may be configured to communicate with the glasses using wireless communications. The computer system may be configured to communicate with the glasses using wired communications. The computer system may be contained in the glasses. The system may be configured to function without connection to or communication with any other computing device. The identity of the person may be visually indicated by displaying a name of the person. The identity of the person may be visually indicated using visual augmented reality. The identity of the person may be audibly indicated by playing a name of the person. The identity of the person may be visually and audibly indicated using visual and audio augmented reality. The data captured by the sensors may be used to update the trained machine learning model in real-time upon user request and/or command. The real-time training update of the machine learning model using the data from a sensor and or multiple sensors can be initiated or triggered using keywords or phrases. The data captured by the sensors are used to train an un-trained machine learning model in real-time upon user request and/or command. The real-time training of the machine learning model using the data from a sensor and or multiple sensors can be initiated or triggered using keywords or key phrases.

BRIEF DESCRIPTION OF THE DRAWINGS

The details of the present invention, both as to its structure and operation, can best be understood by referring to the accompanying drawings, in which like reference numbers and designations refer to like elements.

DETAILED DESCRIPTION

Embodiments may provide improved techniques and devices for person identification that are discreet, offline, that can be trained in real-time, and are physically small to provide the comfortable and convenient use in everyday situations. Embodiments may provide a physically small, offline, mobile solution for providing discreet person identification with instant feedback through augmented reality glasses. Rather than a specific solution to one use case or a set of use cases for a user, embodiments may provide a fully modular platform that may allow the user to configure the device to their current needs.

Examples of use cases for embodiments may include: identifying patients in a hospital; allowing nursing home residents to identify other residents and/or staff; assisting individuals suffering from dementia to recognize family members and others; assisting law enforcement officials with identifying and recognizing necessary individuals; providing a platform for automatic classroom attendance monitoring, etc. These use cases are merely examples and are not intended as an exhaustive list of possible solution.

Figure 1:
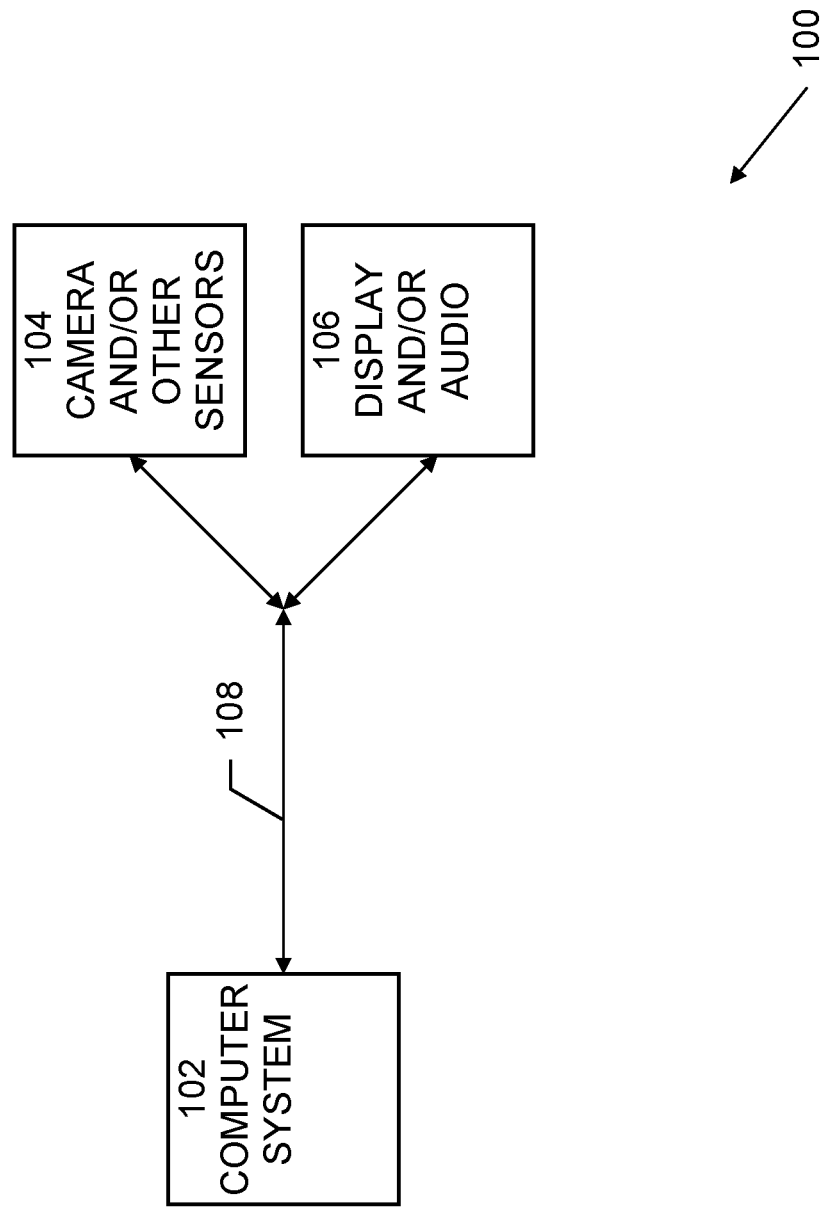
FIG. 1 illustrates an exemplary block diagram of a system for person identification according to embodiments of the present techniques.

An exemplary block diagram of a system 100 for person identification is shown in FIG. 1. System 100 may include a computer system 102, one or more video or still image cameras 104, one or more video display and/or audio output devices 106, and communications 108 between computer system 102, cameras and/or other sensors 104, and display/audio devices 106. Computer system 102 perform processing of the image data, such as computer vision, recognition, and feedback processing, from camera and/or other sensors 104 and may generate the display and audio for display/audio devices 106. Computer system 102 may include any type of computerized device, such as a smartphone, tablet, computer, such as programmed general-purpose computer systems, such as embedded processors, systems on a chip, personal computers, workstations, server systems, and mini-computers or mainframe computers, or in distributed, networked computing environments. Camera and/or other sensors 104 may include one or more cameras and/or other sensors for obtaining images and/or video of the surroundings in general, and also for obtaining voice, periocular and/or iris image, thermal image, and body odor of the person to be identified. Any type of digital video or still image camera may be used and some embodiments may include more than one such camera. Display/audio devices 106 may provide information regarding the identity of the persons whose faces are recognized and may include one or more display screens and one or more audio output devices, such as speakers or earphones. Communications 108 may provide wired or wireless communications.

AI/ML (artificial intelligence/machine learning) techniques may be used to identify the person using the facial image, voice, thermal image, periocular and/or iris image, body odor and/or gait independently or using sensor fusion to perform fusion of two or more or all sensor outputs.

Combining information from multiple biometric sources, such as sensors, is known as information fusion or sensor fusion or sensor data fusion. Person identification using sensor data fusion may consolidate multiple sensor data of biometric information to establish an identity of a person. Multi-modal biometrics using multiple sensors uses multiple modalities for person identification. Sensor fusion may increase the accuracy of person identification compared to single sensor-based person identification. For person identification, sensor data fusion techniques may have the capability to overcome certain inherent limitations of the single mode/sensor biometric technology, such as noisy data and non-universality.

In sensor data fusion, data from different modalities/sensors may be combined, such as face image and voice, or iris image and periocular image, for person identification. In the case of fusion of face image and voice data, instead of using just face image (or just voice data) for person identification, fused face image data and voice data are used for person identification. Sensor data biometric information fusion can be accomplished at several different levels, including at the sensor-level, feature-level, score-level, rank-level, or decision-level. Sensor data or information fusion at initial stages of the processing are considered to be more effective than the systems those fuse information at the later stages. In embodiments, sensor data fusion may occur at various levels.

Figure 2:
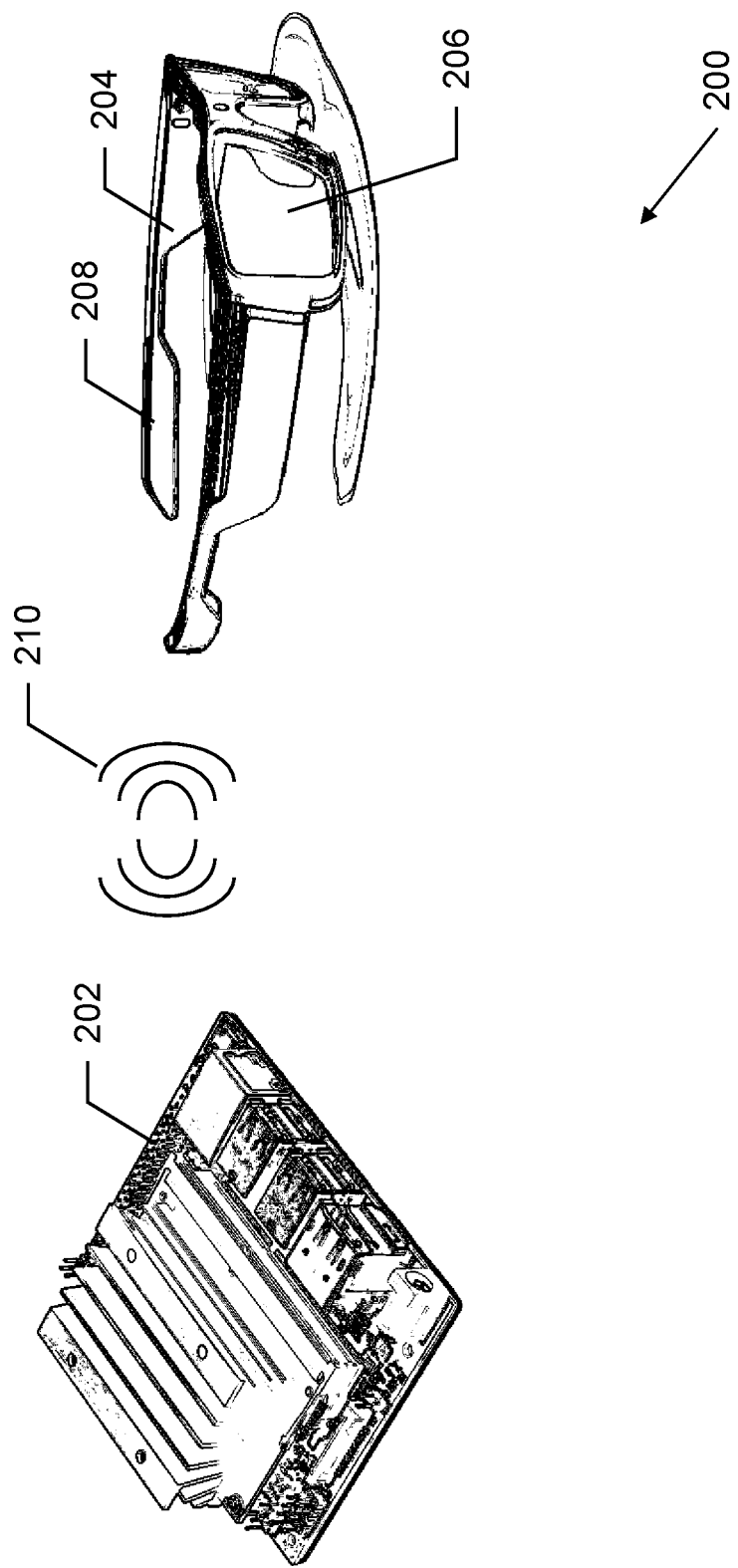
FIG. 2 illustrates an exemplary block diagram of a system for person identification according to embodiments of the present techniques.

An exemplary embodiment 200 of a system for person identification is shown in FIG. 2. This example may include a computer system 202, augmented reality glasses 204, including display devices 206 and audio output devices 208, and wireless communications 210. Embodiments may provide for a user to wear the augmented reality glasses 204 and recognize any individual's face included in their custom training data when that respective individual is seen through the glasses' camera. The glasses 204 may provide the name of the individual, if recognized, in the heads-up display 206 that the user can see while wearing them, as well as provide an audio announcement of that individual's name through the glasses' bone conduction speakers 208. If a person is seen through the glasses' camera but is not recognized, the glasses heads-up display may display "Unknown", and no audio announcement may be played or announced "Unknown". In the event if a person seen through the glasses' camera is not recognized the system has the capability to add the person to the database and train the system in real-time.

In embodiments, glasses 206 may include computer system 202 built in, for example, in the frames of the glasses. Alternatively, although the glasses 206 may serve as the medium for the user to receive feedback on what the platform is providing, in embodiments, the glasses themselves may not perform the classification and processing for the person identification program. In embodiments, the processing of each image frame from the camera and/or other sensor outputs may be done on an external computing platform 202, for example, the NVIDIA Jetson Nano microcomputer, which may be placed in the individual's pocket or on their belt or anywhere on the body. In this example, computing platform 202 is GPU based microcontroller that performs all computer vision, sensor data, recognition and identification, and feedback processing. The external computing platform 202 may receive the information being gathered by the glasses wirelessly 210, for example, via Bluetooth, and may send the processed results back to the glasses similarly. Augmented reality smart glasses 204 may be used to provide a visual 206 and audio 208 display to the user.

In embodiments, the hardware components utilized may be custom designed to implement the present techniques. In embodiments, such as that shown in FIG. 2, the hardware components may be general purpose components that were not prebuilt to provide the person identification solution described herein, therefore a variety of software libraries and tools may be used to successfully perform the system's desired functionality. For example, these software libraries may include an open-source model used to detect faces in an image frame, such as OpenFace or FaceNet. The OpenFace model may be used with the open-source computer vision library, OpenCV, to perform the necessary image processing for each image frame received by the system. These libraries may then be used with a user's desired custom dataset to train their model with their own custom dataset for the system to recognize.

Figure 3:
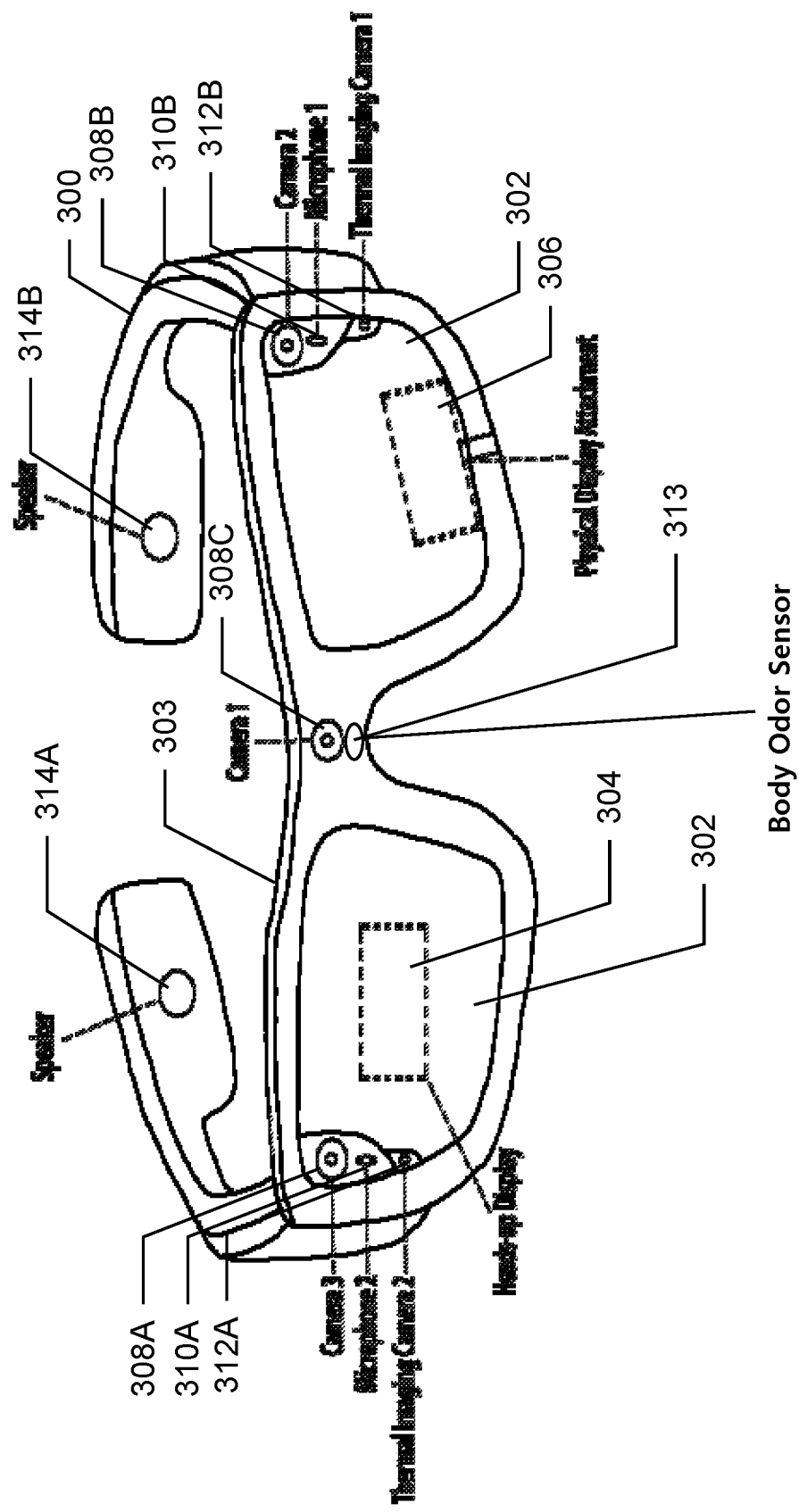
FIG. 3 is an exemplary illustration of exemplary embodiment of smart glasses according to embodiments of the present techniques.

An exemplary embodiment of smart glasses 300 that may be utilized by the present techniques is shown in FIG. 3. As shown in this example, smart glasses 300 may include lenses 302, frame 303, heads-up display 304, physical display attachment 306, one or more digital image or video cameras 308A-C, one or more microphones 310A-B, one or more thermal imaging cameras 312A-B, one or more body odor sensors 313, and one more speakers 314A-B. Small screens/displays, such as heads-up display 304, physical display attachment 306, may be integrated into the smart glass for visual feedback. Displays may be, for example, a heads-up display 304 or an actual physical display screen 306 attached to the smart glass using a hinge or other mechanisms. Multiple sensors may be integrated into the smart glass, such as cameras 308A-C, microphones 310A-B, body odor sensors 313, and thermal imaging cameras 312A-B. For example, the smart glass may have three cameras—one 308C to capture the image of the face, the second one 308A to capture the iris image (the camera may zoom in and out automatically) and the third one (a video camera) 308B may capture gait. Speakers 314A-B may be integrated into the smart glass for audio feedback.

Figure 4:
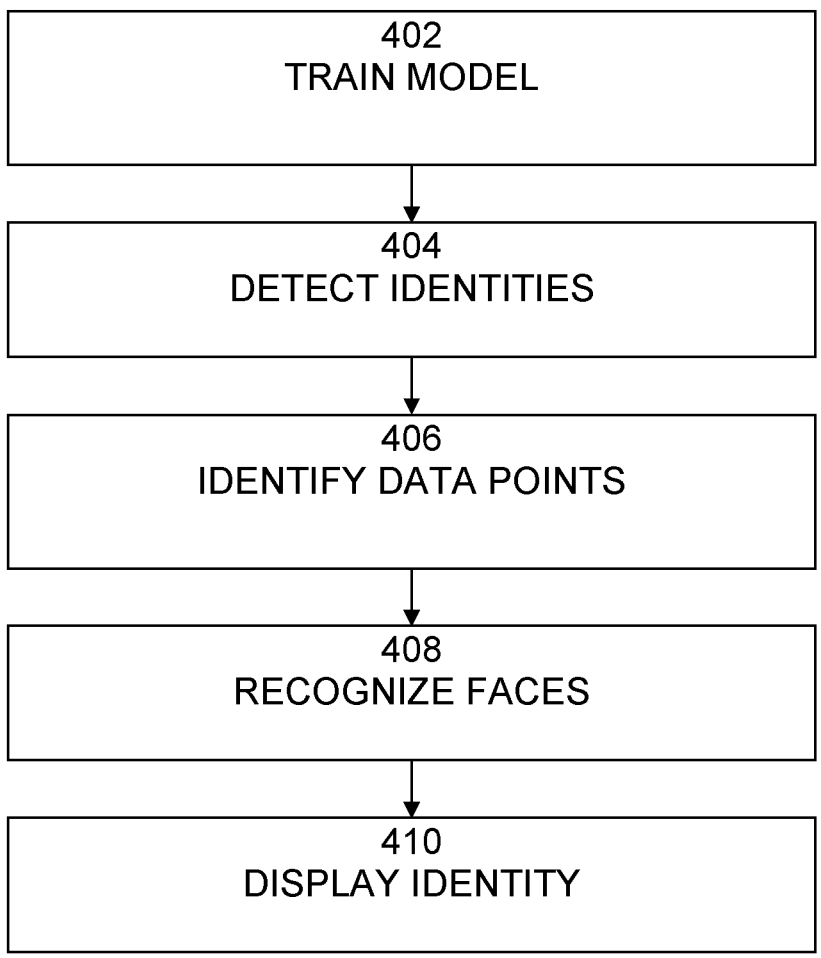
FIG. 4 is an exemplary flow diagram of a process of identity recognition according to embodiments of the present techniques.

An exemplary flow diagram of a process 400 of identity recognition using the example of face recognition is shown in FIG. 4. Embodiments may utilize face recognition, gait recognition, voice recognition, periocular and/or iris image recognition, body odor recognition, thermal image recognition or recognition of identities based on other characteristics of people. These various recognition techniques may be utilized individually, separately, or in combination or fusion. Embodiments may perform person identification in total darkness using odor identification/recognition, thermal image identification/recognition, or voice recognition. For voice recognition to work the person has to say something, while odor identification/recognition and thermal image identification/recognition will work in total darkness and in total silence.

Process 400 begins with 402, in which the model may be trained. In order for the system to recognize the faces that the user desires, the user may provide their own custom dataset of images of each individual's face. This may allow the user to train their own model with the provided classifiers and models. For example, embodiments may use a "free and open source face recognition model" implementation such as OpenFace, which may be used to detect a face or faces in an image. In the event the person to be identified is not in the data base, the system has the capability to take images of that person and label them and use the labeled images to train the system to identify that person in real time. For training, the number of input data sets may be small, so synthetic image generation may be applied to increase the number of data sets to improve person identification accuracy. Neuro-symbolic AI may be used for training and inference. Annotation (labelling) of the image may be done automatically or manually. In embodiments, manual annotation may involve entering identity information for each person to be recognized. In embodiments, manual annotation may involve the user observing the person's face, thus capturing the image of the person's face, and the user speaking the name of the person, which may be captured by the microphone and used to provide audio, or with speech recognition, textual annotation of the image of the person's face. Once the user's model is trained with their custom dataset, the user may begin using the platform for their given application. In embodiments, manual annotation may involve the user observing the person's face and pressing a button on the smart glass or the computing unit when the user hears a name that needs to be stored.

To identify a new person the system may be trained with the sensor outputs, such as facial image, voice, periocular and/or iris image, body odor, thermal image and gait, of that person. The sensor outputs used for training must be labeled. The sensors may collect the image/voice/periocular/iris image/thermal image/body odor/gait discreetly. The sensor output may be labeled automatically using the microphone output using key word/phrase triggering. For example, consider the scenario where the person wearing the smart glass meets Steve and Steve says "Hi I am Steve" and the person says "Nice to meet you Steve". In this case "Hi I am" and "Nice to meet you" can be used as the trigger word/phrase and use to trigger the system to label the sensor outputs of Steve and begin training the ML network to identify Steve in real-time. There may be any number of keywords/key phrases. Embodiments may utilize visible gesture triggering for discreet system training of an individual's name, which is to be added in the data base, by giving a triggering gesture to the system that causes the system to listen for the individual's name after the trigger.

In embodiments, sensors may be triggered using keywords or manually using switches on the smart glass and/or on the computing/processing unit. In embodiments, audible keyword triggers may be used for discreet system training of an individual's name to be added in the data base, and used to automatically train and recognize that individual by the name given in their response.

In embodiments, at 404, face detection may be performed for person identification. To accomplish face detection, the trained model may be used to parse over each frame being received by the system for the presence of one or more faces. Once a face is detected in the image frame, at 406, the detected face may be evaluated against trained model with all of the inputted individuals' face embeddings. This process may provide the identifiable data points of the detected face and may ignore the non-significant information. At 408, the face recognition phase may take the identified data points from the detected face and may compare them to the face embeddings from the trained dataset. If the data comparisons have a high enough confidence that there is a match (for example, 70% or higher confidence), the system will have recognized that individual. At 410, the identity of the recognized individual may be displayed on the visual display and/or using the audio output device. If the confidence of the data match is low (less than 70% for example), then the system may return an "Unknown" recognition, or not acknowledge the face's identity at all.

In embodiments, the system may be turned on or off manually or through voice command. As the person wearing the smart glass walks around, continuous inference, identification of persons already in the database (trained in the model) may be enabled or disabled. If the person in the field of view is not in the database, the system will have the capability to give that feedback to the user visually or through the speaker, and the user may add the person to the database by using the sensor outputs to train the ML system in real-time.

In embodiments, identity feedback may be provided using augmented reality including at least visual and auditory feedback. In embodiments, identity feedback may be provided by display of the person's name and/or playing audio of the person's name. In embodiments, identity feedback may be provided by a combination of real and virtual worlds, real-time interaction, and 3D registration of virtual and real objects. In embodiments, non-human entities may be identified. For example, any entity with a detectable face may be identified.

Embodiments may use an OpenFace implementation that uses the OpenCV (Open Computer-Vision) library to both perform the image processing of each image frame, as well as creating all the necessary data embeddings and training using OpenCV's deep neural network (dnn) library.

OpenFace is a trained deep neural network model that is used primarily for face detection. OpenFace was developed using the Python programming language and was trained using the Torch framework. Torch is a framework used for developing machine learning and deep learning models, and was one of the earliest programs offered into the field. Similar to Torch, a competing machine learning and deep learning framework, TensorFlow, is another popular framework used today. Embodiments may utilize the OpenFace model that was trained by Torch, while other embodiments may utilize TensorFlow as the framework for developing an alternative face recognition model that may have better performance for larger datasets.

Figure 5:
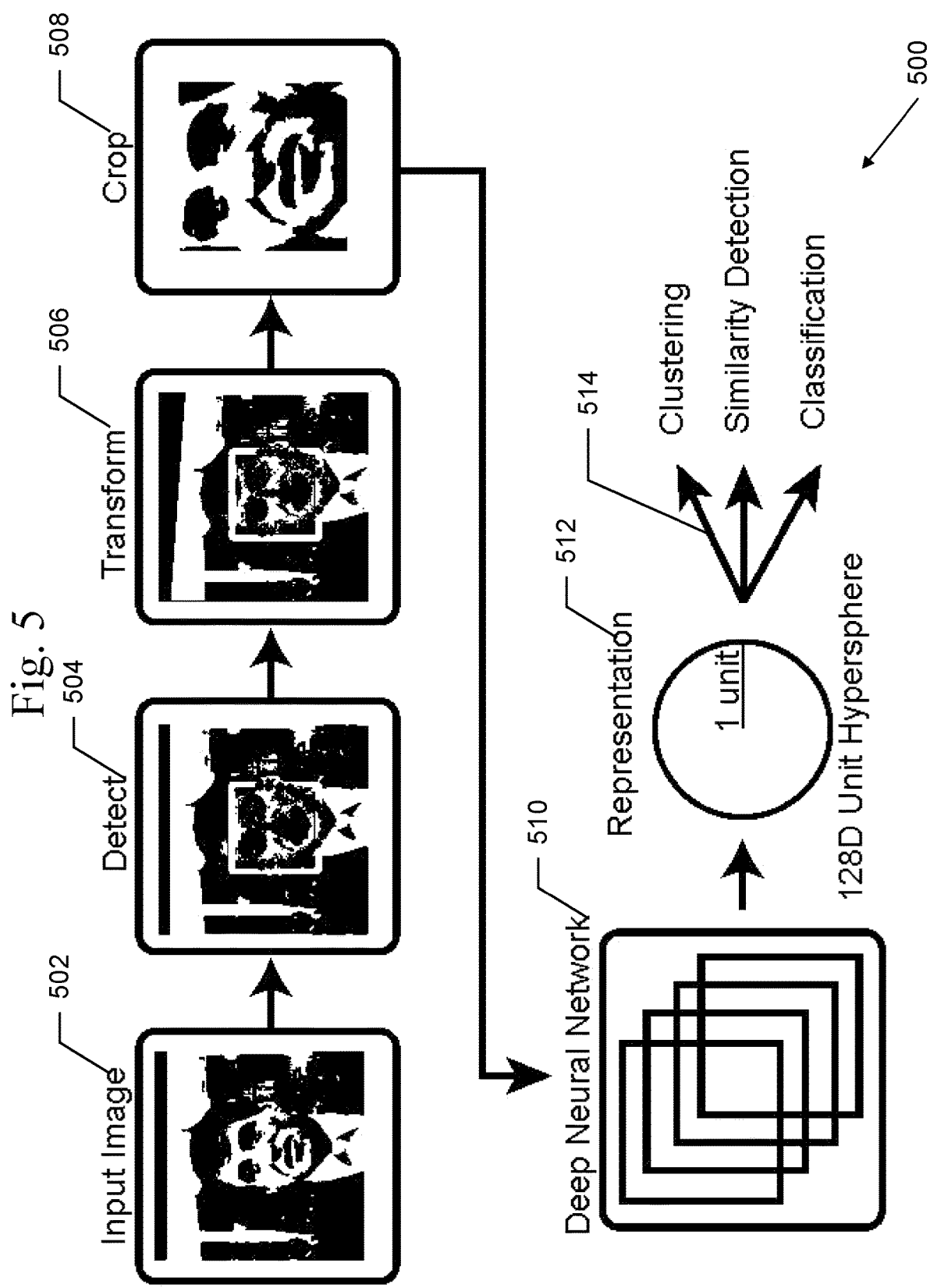
FIG. 5 is an exemplary flow diagram of a process of face detection for person identification according to embodiments of the present techniques.

An exemplary flow diagram of a process 500 of face detection for person identification is shown in FIG. 5. FIG. 5 is merely an example, as similar diagrams can be drawn for person identification using, voice, periocular and/or iris image, thermal image, body odor and gait. The process of performing face detection may use both the OpenFace open-source model provided along with the "dlib" library provided inside the OpenCV package. As shown in FIG. 5, the input image 502 represents each frame of the video feed provided by the camera. At 504, each frame may be analyzed with, for example, OpenCV to determine if a face is present using, for example, pre-trained OpenFace models and OpenCV's dlib functions. For example, embodiments may surround the detected face in abounding box, detect fiducial points, and generate mean fiducial points. At 506, once this face is detected, the face may be transformed for the neural network by trying to make the eyes and bottom lip appear in the same location on each image. At 508, the face may be cropped into a frame that only includes the detected face. Using this cropped frame of the detected fame, at 510, a Deep Neural Network (DNN) may be used to represent (or embed) the face on a 128-dimensional unit hypersphere 512. At 514, the system may compare the values of the image with the user's trained dataset model of their desired faces, and determine if there is a match with the two datasets. This may be done using clustering, similarity detection, classification, or other techniques. For example, OpenCV's dlib and dnn libraries may be used to perform the comparison. If the comparison returns a high enough confidence value (this value is pre-determined by the developer) that there is a match with the input data and data trained, then the system may return a valid match and display the recognized individual's name. If the comparison returns a lower confidence value than the determined threshold, it may display an "Unknown" value that illustrates the face detected does not match with anyone in the trained dataset.

Embodiments may use OpenCV to perform the processing for the system. OpenCV, or "Open Computer-Vision", is an open-source computer vision library that was designed to provide an infrastructure for performing computer vision (such as image processing) as well as machine learning applications. Over time, OpenCV has become more friendly towards deep learning frameworks such as Torch and TensorFlow. Embodiments may use an OpenCV library known as the "dnn" library, or "deep neural network". The "dnn" library provides a valuable function to extract and process the desired face information from image frames. Embodiments may utilize the "dnn" library to, for example, 1) extract embeddings of the detected face in the user's dataset to be used to train the desired model of user face images; 2) uses the OpenFace model to detect a face in the image; 3) train a custom model (or "classifier") from the user's face dataset embeddings with the machine learning library "scikit-learn"; and recognize the face(s) in a given image frame with the user's trained model/classifier by using the OpenFace model to detect a face in the frame, and the "dnn" library's trained model to search for a match.

Embodiments may make combined use of OpenCV's "dnn" library in tandem with the "Scikit-learn" library to perform efficient and accurate recognition of individual's faces in an image frame. Scikit-learn is a BSD-licensed open-source machine learning library that is made specifically for training machine learning and deep learning models. Embodiments may use the scikit-learn library to train the user's custom model/classifier by using the face embeddings that were generated from the user's custom face dataset. This will output the trained model file that will act as the model for OpenCV to "match" a new face in an image frame, with the pre-trained faces from the user's dataset. If a high enough confidence is determined during a data match, the system will provide the intended results as mentioned above.

As the system is taking in a video stream from the camera, OpenCV will be processing each frame received. This requires a significant amount of processing power as the system will be doing the following per image frame received: detecting a face, localizing the face and cropping, extracting face features/data, comparing extracted data with trained models, and providing results. The efficiency of this process is important to the performance of the system, especially for embodiments that provide an "offline, pocket-size mobile platform". The use of the lightweight OpenCV library, Scikit-learn, and the OpenFace model makes this process very efficient and proves to provide a lower processing demand than other embodiments.

Embodiments may use the FaceNet model that was developed using the TensorFlow machine learning framework. This TensorFlow implementation may be used to train a model that is able to detect faces in a given image, similarly to embodiments that use the OpenFace model. The active use of the TensorFlow program requires more computing resources than OpenCV's "dnn" library. The tradeoff however is that a trained model using TensorFlow may provide higher accuracy when dealing with very large datasets from users (an example would be if a user wants to train a model with 100,000 faces in their custom dataset, compared to a model trained with 200 faces).

The FaceNet model promotes scalability for embodiments that have larger datasets for their applications. In such embodiments, the Jetson Nano may not provide adequate performance. Accordingly, embodiments may utilize more powerful hardware or the NVIDIA® developed framework for TensorFlow named TensorRT, which provides a far more lightweight platform aimed towards smaller mobile devices.

Figure 6:
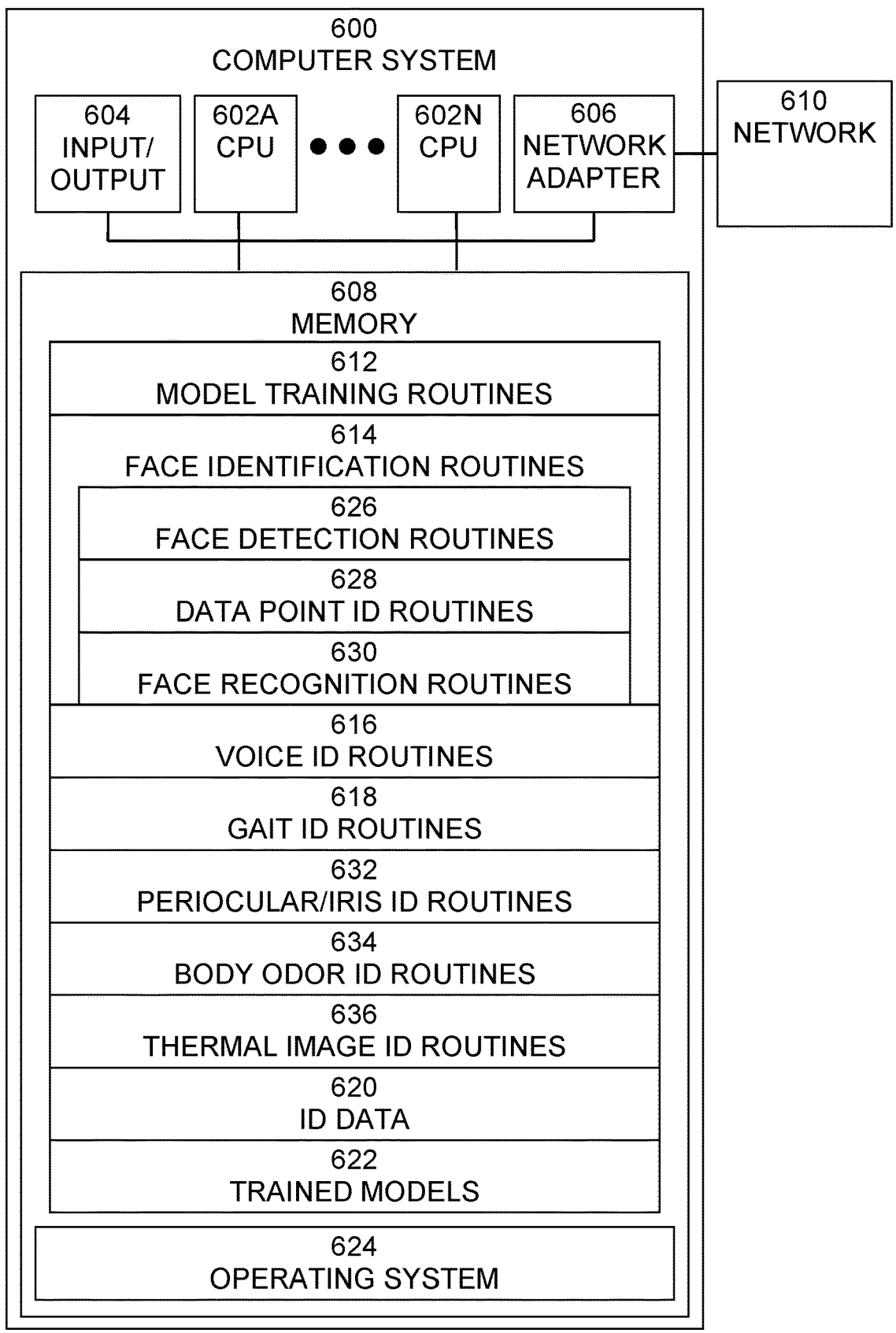
FIG. 6 is an exemplary block diagram of a computer system, in which processes involved in the embodiments described herein may be implemented.

An exemplary block diagram of a computer system 600, in which processes and components involved in the embodiments described herein may be implemented, is shown in FIG. 6. Computer system 600 may be implemented using one or more programmed general-purpose computer systems, such as embedded processors, systems on a chip, personal computers, workstations, server systems, and minicomputers or mainframe computers, or in distributed, networked computing environments. Computer system 600 may include one or more processors (CPUs) 602A-602N, input/output circuitry 604, network adapter 606, and memory 608. CPUs 602A-602N execute program instructions in order to carry out the functions of the present communications systems and methods. Typically, CPUs 602A-602N are one or more microprocessors, such as an INTEL CORE® processor. FIG. 6 illustrates an embodiment in which computer system 600 is implemented as a single multi-processor computer system, in which multiple processors 602A-602N share system resources, such as memory 608, input/output circuitry 604, and network adapter 606. However, the present communications systems and methods also include embodiments in which computer system 600 is implemented as a plurality of networked computer systems, which may be single-processor computer systems, multi-processor computer systems, or a mix thereof.

Input/output circuitry 604 provides the capability to input data to, or output data from, computer system 600. For example, input/output circuitry may include input devices, such as keyboards, mice, touchpads, trackballs, scanners, analog to digital converters, etc., output devices, such as video adapters, monitors, printers, etc., and input/output devices, such as, modems, etc. Network adapter 606 interfaces device 600 with a network 610. Network 610 may be any public or proprietary LAN or WAN, including, but not limited to the Internet.

Memory 608 stores program instructions that are executed by, and data that are used and processed by, CPU 602 to perform the functions of computer system 600. Memory 608 may include, for example, electronic memory devices, such as random-access memory (RAM), read-only memory (ROM), programmable read-only memory (PROM), electrically erasable programmable read-only memory (EEPROM), flash memory, etc., and electro-mechanical memory, such as magnetic disk drives, tape drives, optical disk drives, etc., which may use an integrated drive electronics (IDE) interface, or a variation or enhancement thereof, such as enhanced IDE (EIDE) or ultra-direct memory access (UDMA), or a small computer system interface (SCSI) based interface, or a variation or enhancement thereof, such as fast-SCSI, wide-SCSI, fast and wide-SCSI, etc., or Serial Advanced Technology Attachment (SATA), or a variation or enhancement thereof, or a fiber channel-arbitrated loop (FC-AL) interface.

The contents of memory 608 may vary depending upon the function that computer system 600 is programmed to perform. In the example shown in FIG. 6, exemplary memory contents are shown representing routines and data for embodiments of the processes described above. However, one of skill in the art would recognize that these routines, along with the memory contents related to those routines, may not be included on one system or device, but rather may be distributed among a plurality of systems or devices, based on well-known engineering considerations. The present systems and methods may include any and all such arrangements.

In the example shown in FIG. 6, memory 608 may include model training routines 612, face identification routines 614, voice identification routines 616, gait identification routines 618, periocular and/or iris image identification routines 632, body odor identification routines 634, thermal image identification routines 636, identification data 620, trained models 622, and operating system 624. Model training routines 612 may include software to train the models 622 with a user-provided dataset 620 of images of faces, voice data, gait data, etc., as described above. Face identification routines 614 may include face detection routines 626, data point identification routines 628, and face recognition routines 630. Face detection routines 626 may include software to use the trained model to detect one or more faces in an image, as described above. Data point identification routines 628 may include software to provide the identifiable data points of the detected face, as described above. Face recognition routines 630 may include software to compare the identified data points with the face embeddings in identification data 620 and/or trained model 622 and indicate matches, as described above. Voice identification routines 616 may include software to use identification data 620 and/or trained model 622 to identify one or more persons based on a voice sample, as described above. Gait identification routines 618 may include software to use identification data 620 and/or trained model 622 to identify one or more persons based on postural and/or movement data, as described above. Periocular and/or iris identification routines 632 may include software to use identification data 620 and/or trained model 622 to identify one or more persons based on a periocular and/or iris image sample, as described above. Thermal image identification routines 636 may include software to use identification data 620 and/or trained model 622 to identify one or more persons based on a thermal image sample, as described above. Body odor identification routines 634 may include software to use identification data 620 and/or trained model 622 to identify one or more persons based on a body odor sample, as described above. Operating system 624 may provide overall system functionality.

As shown in FIG. 6, the present communications systems and methods may include implementation on a system or systems that provide multi-processor, multi-tasking, multi-process, and/or multi-thread computing, as well as implementation on systems that provide only single processor, single thread computing. Multi-processor computing involves performing computing using more than one processor. Multi-tasking computing involves performing computing using more than one operating system task. A task is an operating system concept that refers to the combination of a program being executed and bookkeeping information used by the operating system. Whenever a program is executed, the operating system creates a new task for it. The task is like an envelope for the program in that it identifies the program with a task number and attaches other bookkeeping information to it. Many operating systems, including Linux, UNIX®, OS/2®, and Windows®, are capable of running many tasks at the same time and are called multi-tasking operating systems. Multi-tasking is the ability of an operating system to execute more than one executable at the same time. Each executable is running in its own address space, meaning that the executables have no way to share any of their memory. This has advantages, because it is impossible for any program to damage the execution of any of the other programs running on the system. However, the programs have no way to exchange any information except through the operating system (or by reading files stored on the file system). Multi-process computing is similar to multi-tasking computing, as the terms task and process are often used interchangeably, although some operating systems make a distinction between the two.

The present invention may be a system, a method, and/or a computer program product at any possible technical detail level of integration. The computer program product may include a computer readable storage medium (or media) having computer readable program instructions thereon for causing a processor to carry out aspects of the present invention. The computer readable storage medium can be a tangible device that can retain and store instructions for use by an instruction execution device.

The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A system comprising:
    a wearable device comprising a visual display, an audio output device, and at least one sensor;
    a computer system comprising a processor, memory accessible by the processor, and computer program instructions stored in the memory and executable by the processor;
    receiving, from the at least one sensor, data captured by the sensor;
    identifying a person based on the data captured by the sensor using a trained machine learning model; and
    indicating an identity of the person using at least one of the visual display and the audio output device, wherein the wearable device comprises glasses, the sensors comprise at least one of a camera, a microphone, a body odor sensor, and a thermal imaging camera, and wherein the data captured by the sensor and the person is identified from at least one of the groupings consisting of:
        the data captured by the sensor is video and/or image data and the person is identified using gait recognition;
        the data captured by the sensor is image data and the person is identified using periocular and/or iris recognition;
        the data captured by the sensor is image data and the person is identified using thermal image recognition;
        the data captured by the sensor is audio data and the person is identified using voice recognition;
        the data captured by the sensor is body odor data and the person is identified using body odor recognition;
        the data captured by the sensor is at least one of body odor data and thermal image data and the person is identified using body odor recognition or using thermal image recognition in at least one of reduced light, night time, total darkness and total silence;
        the data captured by the sensors are facial image data, voice data, thermal image data, periocular image data, iris image data, body odor data and gait data and the person is identified using fusion data recognition of sensor data fusion of at least two different types of the sensor data; and
        the data captured by the sensors are facial image data, thermal image data, periocular image data and iris image data, and the person is identified using fusion data recognition.

2. The system of claim 1, wherein the data captured by the sensor is image data and the person is identified using facial recognition.

3. The system of claim 1, wherein the facial recognition is performed in real-time and the machine learning model is one of OpenCV Caffe, OpenFace, FaceNet or any other openly available or custom libraries and or models or software.

4. The system of claim 1, wherein the computer system is contained in a device separate from the glasses.

5. The system of claim 4, wherein the computer system is configured to communicate with the glasses using wireless communications.

6. The system of claim 1, wherein the computer system is contained in the glasses.

7. The system of claim 1, wherein the system is configured to function without connection to or communication with any other computing device.

8. A system comprising:
    a wearable device comprising a visual display, an audio output device, and at least one sensor;
    a computer system comprising a processor, memory accessible by the processor, and computer program instructions stored in the memory and executable by the processor;
    receiving, from the at least one sensor, data captured by the sensor;
    identifying a person based on the data captured by the sensor using a trained machine learning model; and
    indicating an identity of the person using at least one of the visual display and the audio output device, wherein the wearable device comprises glasses, and wherein the identity of the person is determined by using at least one of the methods selected from the group consisting of:
        visually indicated by displaying a name of the person;
        visually indicated using visual augmented reality;
        audibly indicated by playing a name of the person; and
        visually and audibly indicated using visual and audio augmented reality.

9. A system comprising:
    a wearable device comprising a visual display, an audio output device, and at least one sensor;
    a computer system comprising a processor, memory accessible by the processor, and computer program instructions stored in the memory and executable by the processor;
    receiving, from the at least one sensor, data captured by the sensor;
    identifying a person based on the data captured by the sensor using a trained machine learning model; and
    indicating an identity of the person using at least one of the visual display and the audio output device, wherein the wearable device comprises glasses, wherein the sensors comprise at least one of a camera, a microphone, a body odor sensor, and a thermal imaging camera and wherein the data captured by the sensors are used to perform at least one of the methods selected from the group consisting of:
        update the trained machine learning model in real-time upon user request and/or command; and
        train an un-trained machine learning model in real-time upon user request and/or command.

10. The system of claim 9, wherein the real-time training update of the machine learning model using the data from a sensor and or multiple sensors can be initiated or triggered using keywords or key phrases.

11. The system of claim 9, wherein the real-time training of the machine learning model using the data from a sensor and or multiple sensors can be initiated or triggered using keywords or key phrases.

* * * * *